(12) United States Patent
Dylla

(10) Patent No.: US 9,435,429 B2
(45) Date of Patent: Sep. 6, 2016

(54) ACTUATING DEVICE FOR AN AUTOMATED DUAL CLUTCH TRANSMISSION OF A MOTOR VEHICLE, AND METHOD FOR CONTROLLING AN ACTUATING DEVICE OF SAID TYPE

(71) Applicant: Dr. Ing. h.c. F. Porsche Aktiengesellschaft, Stuttgart (DE)

(72) Inventor: Simon Dylla, Pforzheim (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 900 days.

(21) Appl. No.: 13/647,428

(22) Filed: Oct. 9, 2012

(65) Prior Publication Data
US 2013/0087003 A1   Apr. 11, 2013

(30) Foreign Application Priority Data
Oct. 10, 2011   (DE) .......................... 10 2011 054 337

(51) Int. Cl.
| | |
|---|---|
| *B60W 10/06* | (2006.01) |
| *F16H 61/04* | (2006.01) |
| *B60W 10/113* | (2012.01) |
| *F16H 59/12* | (2006.01) |
| *F16H 61/688* | (2006.01) |
| *F16H 59/02* | (2006.01) |

(52) U.S. Cl.
CPC .......... *F16H 61/0437* (2013.01); *B60W 10/06* (2013.01); *B60W 10/113* (2013.01); *F16H 59/12* (2013.01); *B60Y 2300/73* (2013.01); *F16H 61/688* (2013.01); *F16H 2059/0243* (2013.01); *F16H 2061/0481* (2013.01); *F16H 2061/0488* (2013.01); *F16H 2306/54* (2013.01); *Y10T 74/20018* (2015.01)

(58) Field of Classification Search
None
See application file for complete search history.

(56) References Cited

U.S. PATENT DOCUMENTS

| | | | | |
|---|---|---|---|---|
| 5,089,965 | A * | 2/1992 | Braun ................. | F16H 61/0248 477/125 |
| 2005/0143217 | A1 * | 6/2005 | Suzuki .................... | B60K 6/48 477/5 |
| 2007/0099756 | A1 * | 5/2007 | Saito ....................... | F16H 59/08 477/121 |
| 2011/0003662 | A1 | 1/2011 | Baur et al. | |

FOREIGN PATENT DOCUMENTS

| | | |
|---|---|---|
| DE | 102009031629 A1 | 1/2011 |
| EP | 1400429 A1 | 3/2004 |
| WO | WO 9206860 A1 | 4/1992 |

* cited by examiner

Primary Examiner — Erin D Bishop
(74) Attorney, Agent, or Firm — Leydig, Voit & Mayer, Ltd.

(57) ABSTRACT

An actuating device for an automated dual clutch transmission of a motor vehicle drivetrain in manual-shift mode includes first and second shift elements disposed in a region of a steering column, the first shift element being configured to effect an upshift and the second shift element being configured to effect a downshift of the dual clutch transmission. Simultaneous operation of the shift elements is configured to effect idle operation of an engine with at least one open transmission clutch. The idle operation is present only while the first and second shift elements are actuated. The shift elements are configured to transmit a torque via a closed transmission clutch when at least one of the shift elements is released. A control device is configured to initiate rotational speed adaptation of the engine as a function of an actuation of the first and second shift elements.

3 Claims, 1 Drawing Sheet

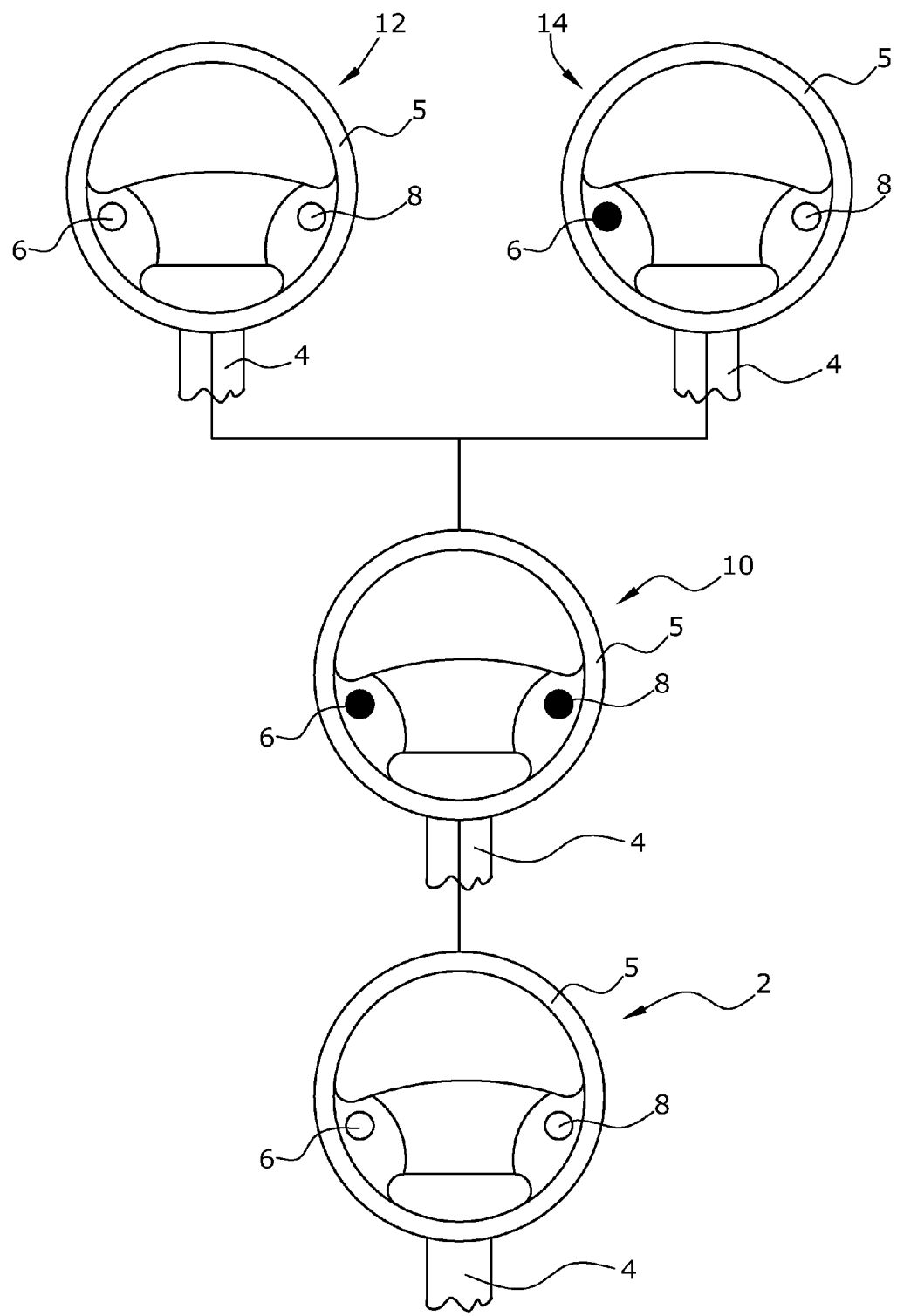

ACTUATING DEVICE FOR AN AUTOMATED DUAL CLUTCH TRANSMISSION OF A MOTOR VEHICLE, AND METHOD FOR CONTROLLING AN ACTUATING DEVICE OF SAID TYPE

CROSS REFERENCE TO RELATED APPLICATIONS

This application claims priority to German Patent Application No. DE 10 2011 054 337.6, filed Oct. 10, 2011, which is hereby incorporated by reference herein in its entirety.

FIELD

The invention relates to an actuating device for an automated dual clutch transmission of a motor vehicle drivetrain in a manual-shift mode, having a first and a second shift element which are arranged in the region of a steering column.

BACKGROUND

Actuating devices of automated dual clutch transmission of a motor vehicle drivetrain in a manual-shift mode are well known. They offer the advantage of making it possible, in the case of automated shift transmissions, for the driver to manually trigger the shift command by means of a tip-action command. This yields a highly spontaneous and fast method of shifting which corresponds to the shift process in a conventional shift transmission. It is also possible in this way to optimize cornering by virtue of a transmission of torque being interrupted, and accordingly only lateral accelerations acting on the driven vehicle wheels. Such an actuating device and a method for controlling such an actuating device are described in DE 10 2009 031 629 A1. Here, when one transmission clutch is closed, the driver must actuate both shift elements simultaneously in order to open the transmission clutch and thereby reduce the torque to 0 Nm. When at least one of the two shift elements is released again, the transmission clutch is closed, such that a torque can be transmitted again. Even though said known actuating device permits direct manual clutch operation by the driver, it has the disadvantage that it is not possible to exert influence on the dynamics of the driving behavior.

SUMMARY

In an embodiment, the present invention provides an actuating device for an automated dual clutch transmission of a motor vehicle drivetrain in manual-shift mode includes first and second shift elements disposed in a region of a steering column, the first shift element being configured to effect an upshift and the second shift element being configured to effect a downshift of the dual clutch transmission. The dual clutch transmission includes a first transmission clutch with an adjoining first component transmission and a second transmission clutch with an adjoining second component transmission. Simultaneous operation of the first and second shift elements is configured to effect idle operation of an engine with at least one open transmission clutch. The idle operation is present only while the first and second shift elements are actuated. The first and second shift elements are configured to transmit a torque via a closed transmission clutch when at least one of the first and second shift elements is released. A control device is configured to initiate rotational speed adaptation of the engine as a function of an actuation of the first and second shift elements.

BRIEF DESCRIPTION OF THE DRAWINGS

Exemplary embodiments of the present invention are described in more detail below, with reference to the drawing in which a shift sequence is schematically illustrated.

DETAILED DESCRIPTION

The present invention relates to an actuating device for an automated dual clutch transmission of a motor vehicle drivetrain in a manual-shift mode, having a first and a second shift element which are arranged in the region of a steering column and having a control device, wherein the dual clutch transmission has a first transmission clutch with an adjoining first component transmission and a second transmission clutch with an adjoining second component transmission, wherein the first shift element effects an upshift of the dual clutch transmission and the second shift element effects a downshift of the dual clutch transmission, and wherein a simultaneous actuation of the shift elements effects idle operation of an engine with at least one open transmission clutch, wherein the idle operation is present only while the shift elements are actuated and, when at least one shift element is released, a torque can be transmitted by means of a closed transmission clutch. The invention also relates to a method for controlling an actuating device of said type.

In an embodiment, the present invention provides a control device having means designed such that a rotational speed adaptation of the engine can be initiated as a function of the actuation of the shift elements. In this way, it is made possible in a simple and cheap way for the driver to exert direct influence on the dynamic driving behavior. One particular embodiment is characterized in that, in the case of a simultaneous release of the shift elements, the transmission clutch to be closed can be engaged without rotational speed adaptation of the engine, and in the case of a time-offset release of the shift elements, the transmission clutch to be closed can be engaged with rotational speed adaptation of the engine. In this way, it is made possible in a particularly simple way for the driver, if he so demands, to close the clutch in an abrupt manner without rotational speed adaptation of the engine, such that intentional wheel slip can be generated, as a result of which the vehicle can be placed into a limit range in terms of driving dynamics.

By virtue of the fact that, in an embodiment of the actuating device, in idle operation, when the shift elements are actuated simultaneously, both transmission clutches are open and, when the shift elements are released, the control device performs a selection of the clutches to be closed, the greatest possible variability of the clutch engagement process as a function of the driver demand is provided. A simpler embodiment is characterized in that, in idle operation, when the shift elements are actuated simultaneously, one transmission clutch is open and the other transmission clutch is closed, and when the shift elements are released, the control device initiates a transmission of torque by means of the closed transmission clutch.

In an embodiment of the actuating device, the shift elements are in the form of shift buttons. In an alternative embodiment of the actuating device, the shift elements are in the form of shift paddles. Both the shift buttons and also the shift paddles are arranged in the region of the steering column, in particular on the steering wheel itself.

In an embodiment, the present invention provides a method for controlling an actuating device of said type, wherein in the initial state, a torque is transmitted via the first transmission clutch to the first component transmission, wherein the second transmission clutch is open, in a first step, both shift elements are actuated simultaneously by a driver and the transmission of torque is interrupted, and in a second step, the shift elements are released and a torque is transmitted via the first transmission clutch to the first component transmission or is transmitted via the second transmission clutch to the second component transmission, wherein the rotational speed of the engine can be adapted on the basis of the actuation of the shift elements. A particularly high degree of variability for the clutch engagement process in the second step is provided in that, in the first step, the transmission of torque is interrupted by means of a disengagement of the first transmission clutch.

If, in the second step, the shift elements are released simultaneously, a torque is transmitted, without rotational speed adaptation of the engine, via one transmission clutch to one component transmission. If, in the second step, the shift elements are released in a time-offset manner, a torque is transmitted, with rotational speed adaptation of the engine, via one transmission clutch to one component transmission.

The single FIGURE shows, in schematic form, a shift sequence for an actuating device 2, 10, 12 and 14 according to an embodiment of the invention. A starting state is illustrated by the actuating device 2. In the region of a longitudinal column 4, specifically on the steering wheel 5, there are arranged schematically illustrated shift elements in the form of shift paddles 6, 8. The first shift element 6 effects an upshift of a dual clutch transmission and the second shift element 8 effects a downshift of the dual clutch transmission. In the initial state, a torque is transmitted via one transmission clutch into a motor vehicle drivetrain in a known way. Here, the automated dual clutch transmission is in a manual-shift mode, that is to say the driver can exert manual influence on the transmission by means of the shift paddles 6, 8. For this purpose, the actuating device 2, 10, 12 and 14 has a control device which may self-evidently also be integrated in a control device of the motor vehicle engine. The schematically illustrated shift paddles 6, 8 are illustrated as simple circles in the case of the actuating device 2 situated in the initial state, which means that in said state, the shift paddles 6, 8 are not actuated and the vehicle is for example traveling straight ahead.

If idle operation of the drivetrain is now desired owing to cornering, in a first step, both shift paddles 6, 8 are actuated simultaneously, which is illustrated by solid circles in the case of the actuating device 10. As a result, the engaged first transmission clutch is disengaged, as a result of which the transmission of torque is interrupted. Both transmission clutches of the dual clutch transmission are now in the disengaged state, resulting in the greatest possible degree of variability for a later clutch engagement. It is self-evidently also possible that, in the first step, by corresponding means in the control device, the transmission of torque is realized by means of a connection of the drivetrain to the second, already disengaged transmission clutch. In the case of such an approach, the first transmission clutch would remain in the engaged state.

In a second step, the shift elements 6, 8 are then released again, and a torque can be transmitted via one transmission clutch to one component transmission again. With the actuating device 2, 10, 12, 14 according to the invention, it is now possible for the driver himself to define whether the clutch engagement takes place with or without rotational speed adaptation of the engine. The illustrated actuating device 12 shows the situation in which both shift paddles 6, 8 are released simultaneously, as a result of which the torque is now transmitted, without rotational speed adaptation of the engine, via one transmission clutch to one component transmission. The clutch engagement is thus abrupt, as a result of which the driver can intentionally generate wheel slip.

The actuating device 14 shows a shift paddle 6 which is still actuated and a shift paddle 8 which is released, as a result of which a clutch engagement takes place with a rotational speed adaptation of the engine. Here, the clutch engagement thus takes place in a smooth manner.

While the invention has been particularly shown and described with reference to preferred embodiments thereof, it will be understood by those skilled in the art that various changes in form and details may be made therein without departing from the spirit and scope of the invention.

What is claimed is:

1. A method for controlling an actuating device for an automated dual clutch transmission of a motor vehicle drivetrain in a manual-shift mode, the dual clutch transmission including a first transmission clutch with an adjoining first component transmission and a second transmission clutch with an adjoining second component transmission, the method comprising:
   providing the actuating device so as to include:
      a first shift element disposed in a region of a steering column and configured to effect art upshift of the dual clutch transmission,
      a second shift element disposed in the region of the steering column and configured to effect a downshift of the dual clutch mechanism, simultaneous operation of the first and second shift elements being configured to effect idle operation of an engine with at least one of the first transmission clutch and the second transmission clutch being open, the idle operation being present only while the first and second shift elements are actuated, the first and second shift elements being configured to transmit a torque with at least one of the first transmission clutch and the second transmission clutch being closed when at least one of the first and second shift elements is released, and
      a control device configured to initiate rotational speed adaptation of the engine as a function of an actuation of the first and second shift elements;
   transmitting torque, in an initial state of the dual clutch transmission, via the first transmission clutch to the first component transmission, with the second transmission clutch being open;
   actuating the first and second shift elements simultaneously, in a first step, by a driver so as to interrupt the transmitting of torque; and
   releasing the first and second shift elements, in a second step, so as to transmit torque via the first transmission clutch to the first component transmission or via the second transmission clutch to the second component transmission, a rotational speed of the engine being adapted by the control device based on the actuation of the shift elements, wherein in response to the release of the first and second shift elements in a time offset manner, the control device provides rotational speed adaptation of the engine with torque transmission via one of the transmission clutches to a respective one of the first and second component transmissions.

2. The method for controlling the actuating device as recited in claim 1, wherein, in the first step, the transmission of torque is interrupted by disengagement of the first transmission clutch.

3. The method for controlling the actuating device as claimed in claim 1, wherein, in the second step, in response to the release of the first and second shift elements simultaneously, torque is transmitted, without rotational speed adaptation of the engine, via one of the transmission clutches to a respective one of the first and second component transmissions.

* * * * *